(12) United States Patent
Kumar et al.

(10) Patent No.: US 7,437,308 B2
(45) Date of Patent: *Oct. 14, 2008

(54) METHODS FOR ESTIMATING THE SEASONALITY OF GROUPS OF SIMILAR ITEMS OF COMMERCE DATA SETS BASED ON HISTORICAL SALES DATE VALUES AND ASSOCIATED ERROR INFORMATION

(75) Inventors: Mahesh Kumar, Cambridge, MA (US); Peter Gaidarev, Malden, MA (US); Jonathan W. Woo, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 11/017,285

(22) Filed: Dec. 20, 2004

(65) Prior Publication Data

US 2005/0102272 A1    May 12, 2005

Related U.S. Application Data

(63) Continuation of application No. 09/975,769, filed on Oct. 11, 2001, now Pat. No. 6,834,266.

(51) Int. Cl.
*G06F 17/30* (2006.01)
(52) U.S. Cl. .................................................. 705/10
(58) Field of Classification Search ............... 705/10
See application file for complete search history.

(56) References Cited

U.S. PATENT DOCUMENTS

| | | | |
|---|---|---|---|
| 5,237,496 A | 8/1993 | Kagami et al. | |
| 5,237,498 A | 8/1993 | Tenma et al. | |
| 5,450,314 A | 9/1995 | Kagami et al. | |
| 5,596,493 A * | 1/1997 | Tone et al. | ..................... 705/10 |
| 5,758,328 A | 5/1998 | Giovannoli | |
| 5,765,143 A | 6/1998 | Sheldon et al. | |
| 5,790,426 A * | 8/1998 | Robinson | ..................... 705/10 |
| 5,822,736 A | 10/1998 | Hartman et al. | |
| 5,933,813 A | 8/1999 | Teicher et al. | |

(Continued)

FOREIGN PATENT DOCUMENTS

EP    1271278    2/2003

(Continued)

OTHER PUBLICATIONS

Jain, A.K. et al., Data clustering: A Review ACM Computing Surveys, vol. 31, No. 3, Sep. 1999.*

(Continued)

*Primary Examiner*—Scott L Jarrett
(74) *Attorney, Agent, or Firm*—Chapin IP Law, LLC

(57) ABSTRACT

A set of data is received containing values associated with respective data points, the values associated with each of the data points being characterized by a distribution. The values for each of the data points are expressed in a form that includes information about a distribution of the values for each of the data points. The distribution information is used in clustering the set of data with at least one other set of data containing values associated with data points.

13 Claims, 8 Drawing Sheets

U.S. PATENT DOCUMENTS

Figure 1:
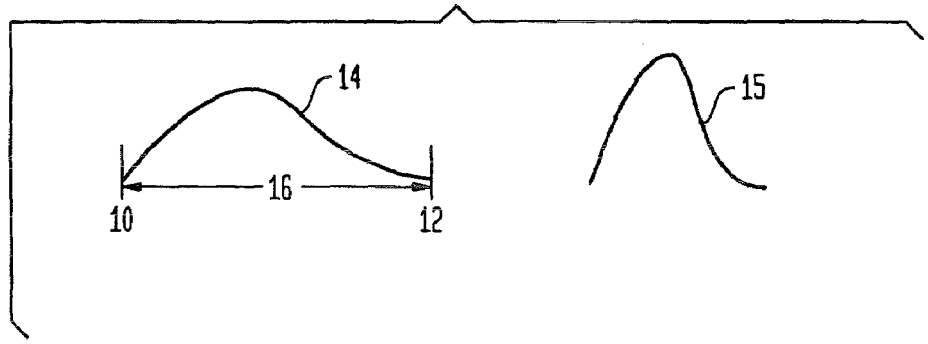

| | | | |
|---|---|---|---|
| 5,963,919 | A | 10/1999 | Brinkley et al. |
| 5,974,396 | A | 10/1999 | Anderson et al. |
| 5,983,224 | A | 11/1999 | Singh et al. |
| 5,987,425 | A | 11/1999 | Hartman et al. |
| 6,006,196 | A | 12/1999 | Feigin et al. |
| 6,009,407 | A | 12/1999 | Garg |
| 6,029,139 | A | 2/2000 | Cunningham et al. |
| 6,061,691 | A | 5/2000 | Fox |
| 6,092,049 | A * | 7/2000 | Chislenko et al. ............. 705/10 |
| 6,151,582 | A | 11/2000 | Huang et al. |
| 6,205,431 | B1 | 3/2001 | Willemain et al. |
| 6,230,150 | B1 | 5/2001 | Walker et al. |
| 6,253,187 | B1 | 6/2001 | Fox |
| 6,293,866 | B1 | 9/2001 | Walker et al. |
| 6,306,038 | B1 | 10/2001 | Graves et al. |
| 6,308,162 | B1 | 10/2001 | Ouimet et al. |
| 6,328,648 | B1 | 12/2001 | Walker et al. |
| 6,331,144 | B1 | 12/2001 | Walker et al. |
| 6,341,269 | B1 | 1/2002 | Dulaney et al. |
| 6,366,890 | B1 | 4/2002 | Usrey |
| 6,397,166 | B1 | 5/2002 | Leung et al. |
| 6,397,197 | B1 | 5/2002 | Gindlesperger |
| 6,493,678 | B1 | 12/2002 | Foster et al. |
| 6,496,834 | B1 | 12/2002 | Cereghini et al. |
| 6,520,856 | B1 | 2/2003 | Walker et al. |
| 6,553,352 | B2 | 4/2003 | Delurgio et al. |
| 6,792,399 | B1 * | 9/2004 | Phillips et al. ............ 705/36 R |
| 6,834,266 | B2 | 12/2004 | Kumar et al. |
| 2001/0014868 | A1 | 8/2001 | Herz et al. |
| 2001/0044766 | A1 | 11/2001 | Keyes |
| 2001/0047293 | A1 | 11/2001 | Waller et al. |
| 2002/0022985 | A1 | 2/2002 | Guidice et al. |
| 2002/0029176 | A1 | 3/2002 | Carlson et al. |
| 2002/0072977 | A1 | 6/2002 | Hoblit et al. |
| 2002/0147630 | A1 | 10/2002 | Rose et al. |
| 2002/0174119 | A1 | 11/2002 | Kummamuru et al. |
| 2003/0028437 | A1 | 2/2003 | Grant et al. |
| 2003/0046127 | A1 | 3/2003 | Crowe et al. |
| 2003/0104861 | A1 | 6/2003 | Gaidarev et al. |
| 2003/0229502 | A1 | 12/2003 | Woo |
| 2005/0027621 | A1 | 2/2005 | Ramakrishnan |

FOREIGN PATENT DOCUMENTS

| | | |
|---|---|---|
| JP | 2001084239 | 3/2001 |
| WO | WO 90/09638 | 8/1990 |
| WO | WO 98/21907 | 5/1998 |
| WO | WO 02/29696 | 4/2002 |

OTHER PUBLICATIONS

Kumar, M. et al., Clustering Seasonality Patterns in the Presence of Errors KDD'02, ACM.*

Achabal et al., "A Decision Support System for Vendor Managed Inventory", Winter 2000, Journal of Retailing, vol. 76, No. 4, p. 430.

"Fair Market to Take Guesswork Out of Sale Pricing With New Performance-Based Markdow Engine: Major Step in Online Selling to Help Merchants Maximize Margin," Business Wire, May 21, 2001. (3 pages).

Ackerman, "Looking Back to Fashion's Future", Boston Globe.

SAS Institute Software, www.sas.com, Jun. 1998, pp. 1-7.

SAS/STAT User's Guide, Version 8 (SAS Publishing: 1999), pp. 1-129.

Ackerman, Jerry, "Looking Back to Fashion's Future," The Boston Globe Oct. 7, 1998 [retrieved Jan. 7, 2003], 3 pages, retrieved from: archive.org and Google.com.

Datz, Todd, "Pythagorean Pantsuits-Modeling Merchandise," *CIO Magazine*, Feb. 15, 1999 [retrieved Jan. 7, 2003], 1 page, retrieved from Google.com and archive.org.

"Gymboree Selects TSI to Design and Implement Inventory Optimization and Pricing Solution," TSI Press Release, Jan. 13, 1999 [retrieved Jan. 7, 2003], 2 pages, retrieved from: Google.com and archive.com.

Koloszyc, Ginger, "Merchants Try Complex MathematicalTools to Improve Inventory Decisions," *Stores Magazine* Nov. 1999 [retrieed Jan. 7, 2003], 3 pages, retrieved from: Google.com and archive.org.

Levy, Michael R. and Woo, Jonathan, Ph.D. "Yield Management in Retail: The Application of Advanced Mathematics to the Retail Pricing Dilemma," TSI (Marketing Materials), 1999.

Makridakis, Spyros, "Forecasting," copyright 1997, John Wiley & Sons, Inc., pp. 312, 373-374.

Merritt, Jennifer, "Company makes Science out of Shopping Trends," *Boston Business Journal* Sep. 3, 1998 [retrieved on Jan. 7, 2003], 3 pages, retrieved from: Google.com and archive.org.

Screenshots of Technology Strategy, Inc., www.grossprofit.com, Mar. 2, 2000 [retrieved on Jan. 7, 2003], 9 pages, retrieved from: Google.com and archive.org.

Smith, Stephen A. and Achabal, Dale D. "Clearance Pricing and Inventory Policies for Retail Chains," Management Science 44:3 (Mar. 1998), pp. 285-300.

"Special Feature: Alliances of Accenture: Accenture, Profitlogic team helps retailers enhance sales," *Businessworld* (Feb. 5, 2001).

Technology Strategy, Inc., company marketing materials, copyright 1991, Technology Strategy, Inc.

Technology Strategy, Inc., company marketing materials, copyright 1998, Technology Strategy, Inc.

"Technology Strategy, Inc. Names Jonathan Woo as Director of R&D," TSI Press Release, Jul. 15, 1998 [retrieved Jan. 7, 2003], 1 pages, retrieved from: Google.com and archive.org.

"Wal-mart: Retailer of the Century: High-Tech Complements Human Touch," *Discount Store News* Oct. 11, 1999 [retrieved Jun. 26, 2002], 3 pages, retrieved from: www.lexus.com.

Wang, Qinan and Wu, Zhang, "Improving a supplier's quantity discount gain from many different buyers," *IIE Transactions* vol. 32 (2000) 1071-1079.

Rice, John A., "Mathematical Statistics and Data Analysis", Second Edition, *Duxbury Press*.

Keogh, Eamonn J., & Michael J. Pazzani. "An enhanced Representation of Time-Series which Allows Fast and Accurate Classification, Clustering and Relevance Feedback". *Fourth Conference on Knowledge Discovery in Databases and Data Mining* (1998).

Keogh, Eamonn J., & Padhriac Smyth. "A Probabilistic Approach to Fast Pattern MAtching in Time Series Databases". *Proceedings of the Third Conference in Knowledge Discovery in Databases and Data Mining* (1997).

Agrawal, Rakesh, et al. "Fast Similarity Search in the Presence of Noise, Scaling, and Translation on Time-Series Databases". *VLDB* pp. 409-501 (1995).

Keogh, Eamonn J., & Michael J. Pazzani. "Relevance Feedback Retrieval of Time-Series data". *22nd International ACM-SIGIR Conference on Research and Development in Information Retrieval* (1999).

Kopalle, Praveen K., et al. "The Dynamic Effect of discounting on Sales: Empirical Analysis and normative Pricing Implications". *Marketing Science* pp. 317-332 (1999).

Silva-Risso, Jorge M., et al. "A Decision Support System for Planning Manufacturer's Sales Promotion Calendars". *Marketing Science*, pp. 274-300 (1999).

Gafney, Scott & Padhriac Smyth. "Trajectory Clustering with Mixtures of Regression of Models". *Proceedings of the ACM SIGKDD International Conference on KNowledge Discovery and Data Mining* (1999).

Keogh, Eamonn J. "A Fast and Robust Method for Pattern Matching in Time-Series Databases". *Proceedings of WUSS* (1997).

Jain, A.K., & R.C. Dubes. "Algorithms for Clustering Data". *Prentice-Hall* (1988).

\* cited by examiner

METHODS FOR ESTIMATING THE SEASONALITY OF GROUPS OF SIMILAR ITEMS OF COMMERCE DATA SETS BASED ON HISTORICAL SALES DATE VALUES AND ASSOCIATED ERROR INFORMATION

This application is a continuation of U.S. Ser. No. 09/975,769, filed Oct. 11, 2001, entitled "Clustering," and claims the benefit of PCT Serial Number US02/32234, filed Oct. 9, 2002, entitled "Clustering," the teachings of which are incorporated herein by reference.

BACKGROUND

This invention relates to clustering, for example, of seasonalities to better forecast demand for items of commerce.

Clustering means grouping objects, each of which is defined by values of attributes, so that similar objects belong to the same cluster and dissimilar objects belong to different clusters. Clustering has applications in many fields, including medicine, astronomy, marketing, and finance.

Clustering is done on the assumption that attribute values representing each object to be clustered are known deterministically with no errors. Yet, often, the values representing an object to be clustered are not available. Sometimes statistical methods are used to get estimated or average values for a given object.

SUMMARY

In general, in one aspect, the invention features a method that includes (a) receiving a set of data containing values associated with respective data points, the values associated with each of the data points being characterized by a distribution, (b) expressing the values for each of the data points in a form that includes information about a distribution of the values for each of the data points, and (c) using the distribution information in clustering the set of data with at least one other set of data containing values associated with data points.

Implementations of the invention may include one or more of the following features. The respective data points are related in a time-sequence. The data points relate to a seasonality of at least one item of commerce. Each of the sets of data relates to seasonalities of items of commerce. The items of commerce comprise retail products, the data points relate to times during a season, and the values associated with each of the data points correspond to respective ones of the retail products. The method also includes determining statistical measures of the variability of the values with respect to the data point. The data is expressed in a form that includes a mean of the values associated with a data point and a statistical measure of the distribution with respect to the mean. The statistical measure comprises a standard deviation. The clustering of data includes measuring a distance between pairs of the sets of data. The distance is measured based on the means and variances at the data points. The distribution of the values is Gaussian. The clustering of data includes merging the data sets belonging to a cluster using a weighted average. The method includes merging the seasonalities of the data sets belong to a cluster.

In general, in another aspect, the invention features a machine-accessible medium that when accessed results in a machine performing operations that include: (a) receiving a set of data containing values associated with respective data points, the values associated with each of the data points being characterized by a distribution, (b) expressing the values for each of the data points in a form that includes information about a distribution of the values for each of the data points, and (c) using the distribution information in clustering the set of data with at least one other set of data containing values associated with data points.

In general, in another aspect, the invention features a method that includes (a) receiving sets of data, each of the sets containing values associated with respect data points, the values associated with each of the data points being characterized by a distribution, (b) evaluating a distance function that characterizing the similarity or dissimilarity of at least two of the sets of data, the distance function including a factor based on the distributions of the values in the sets, and (c) using the evaluation of the distance function as a basis for clustering of the sets of data.

In general, in another aspect, the invention features a method that includes (a) receiving data that represents seasonality time-series for each of a set of retail items, the data also representing error information associated with data values for each of a series of time points for each of the items, and (b) forming composite seasonality time-series based on respective clusters of the retail item seasonality time-series, the composites formed based in part on the error information.

Other advantages and features will become apparent from the following description and from the claims.

Figure 2:
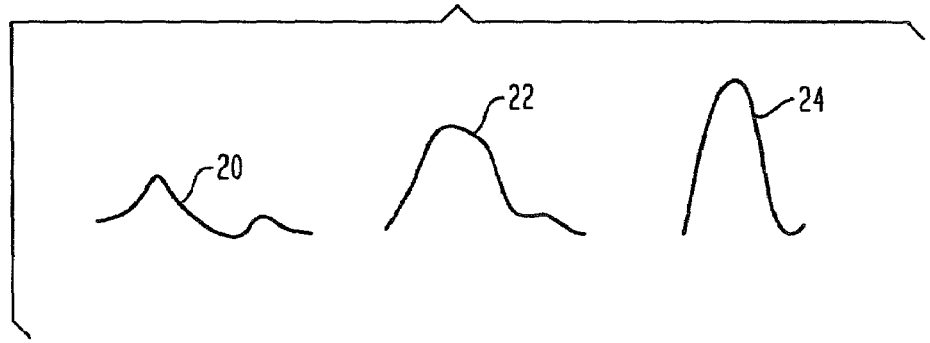
Figure 3:
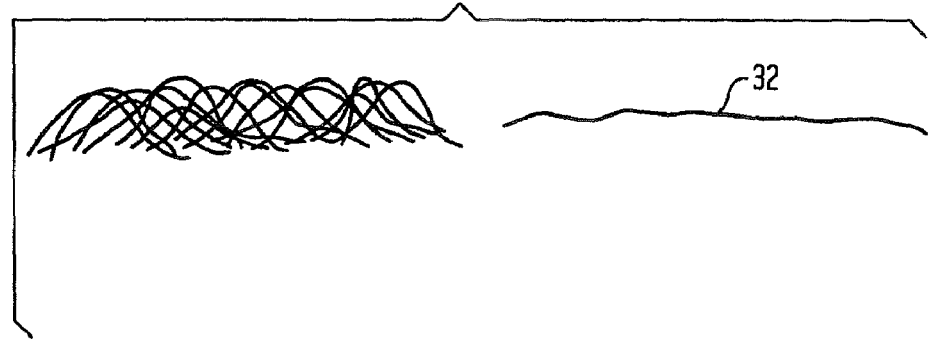
Figure 4:
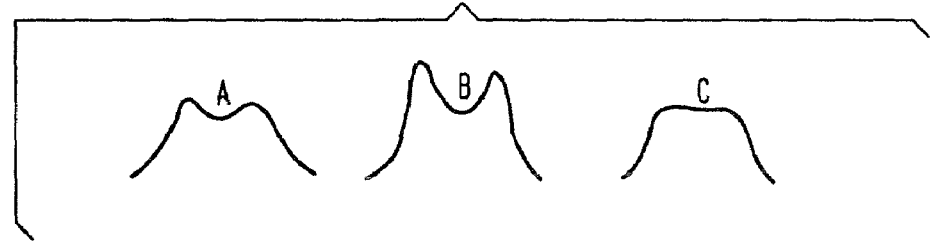
Figure 5A:
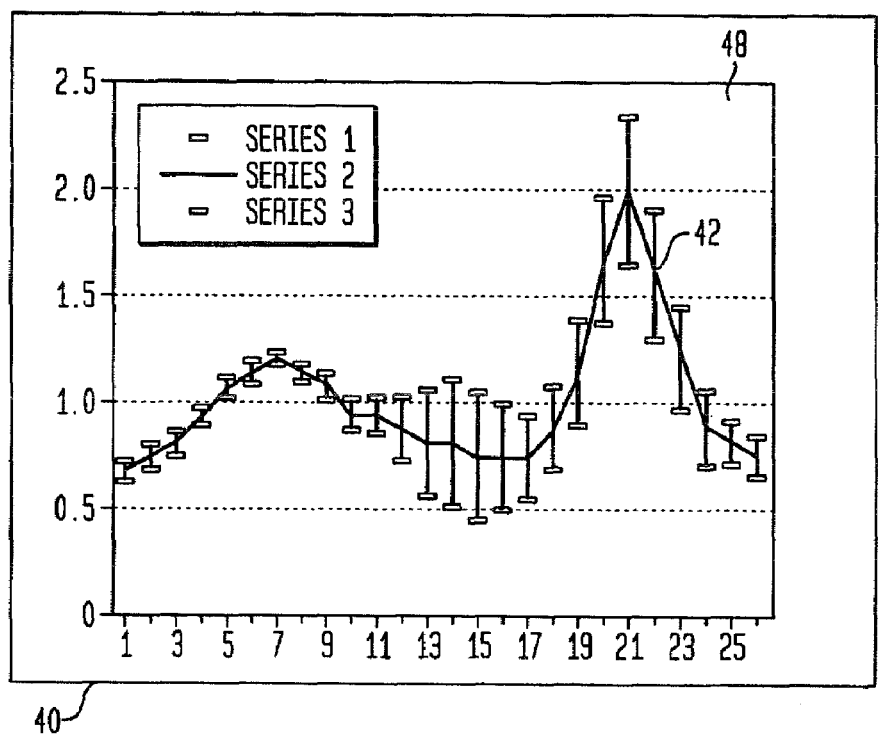
Figure 5B:
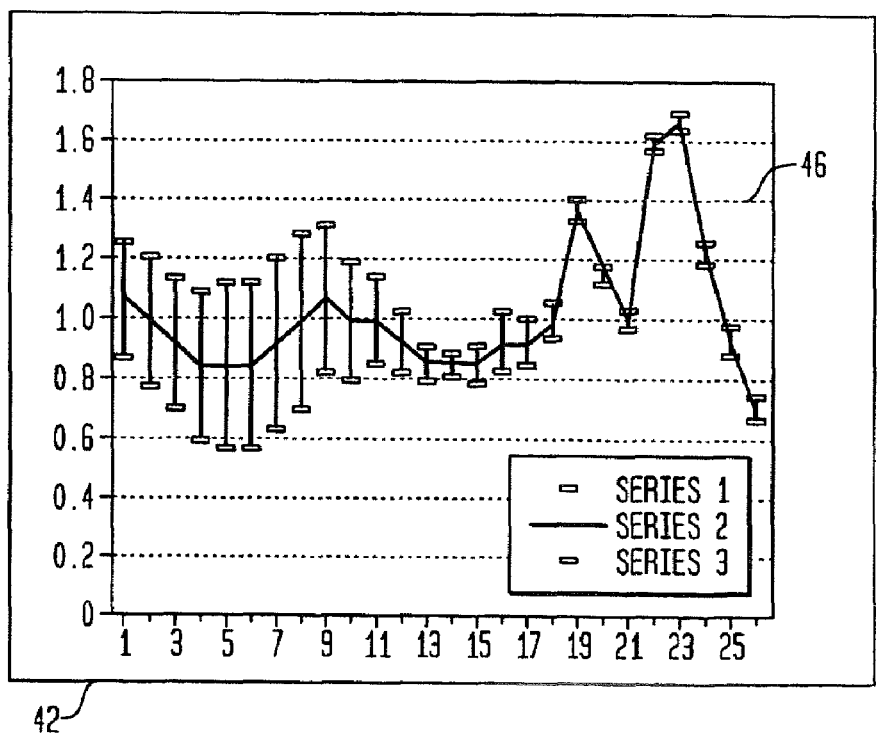
Figure 5C:
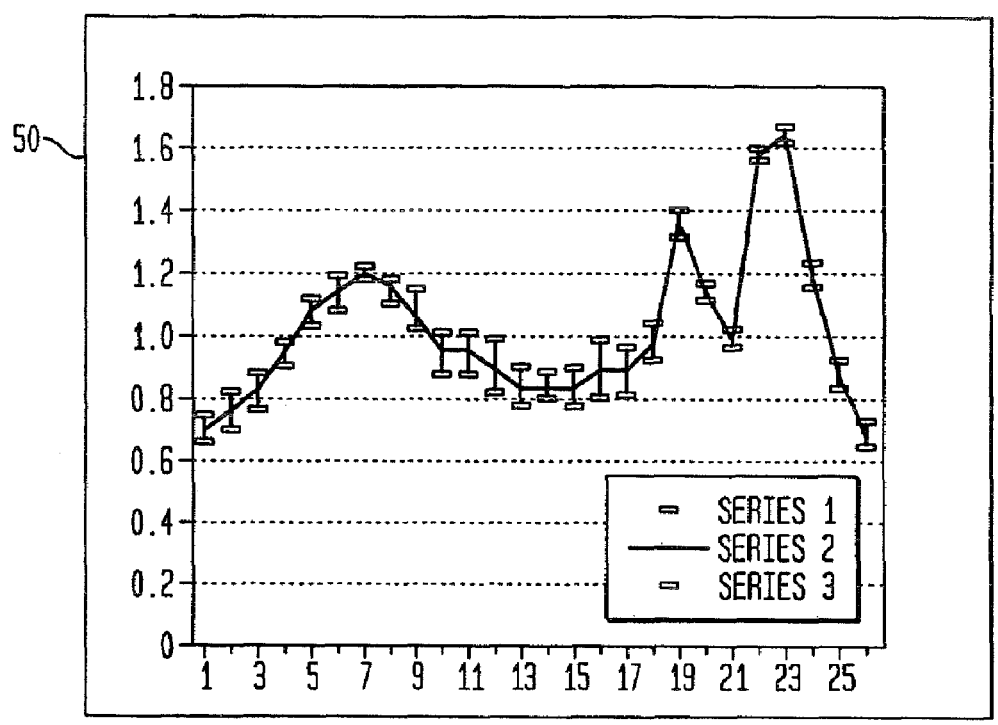
Figure 6:
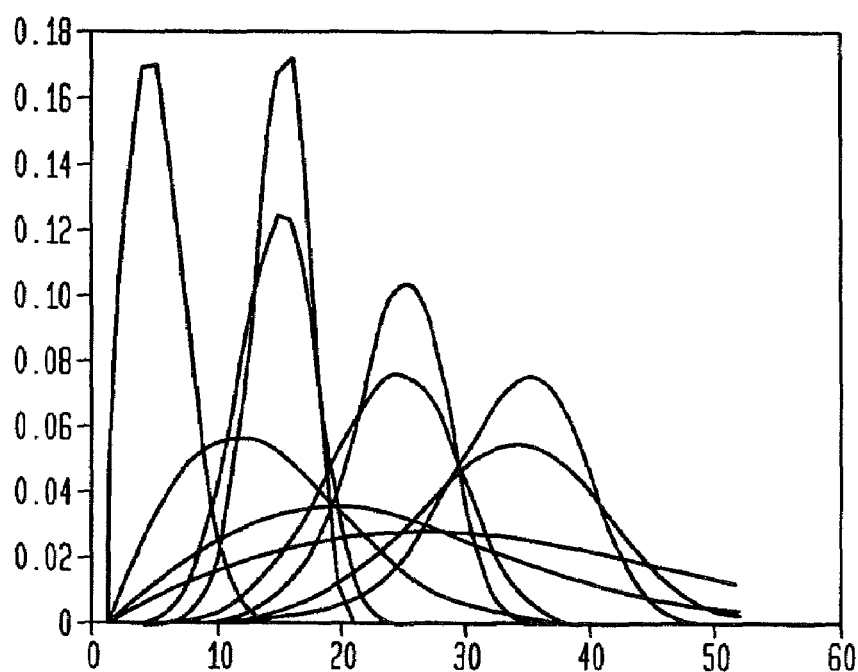

DESCRIPTION (FIG. 1 shows product life cycle curves.
FIG. 2 shows a seasonality curve and two sales curves.
FIG. 3 shows a concatenation of PLC curves and an average curve.
FIG. 4 shows three seasonality curves.
FIG. 5 illustrates the merger of time-series.
FIG. 6 illustrates the merger of time-series.
FIGS. 7, 8, 9, 10 and 11 show seasonality curves.
FIG. 12 is a flow chart.)

INTRODUCTION

The clustering of objects can be improved by incorporating information about errors, which are a measure of level of confidence, in data that characterize the objects to be clustered. Instead of relying on simple average values for attributes of the objects, measures of error such as standard deviation or an estimate of an entire distribution of the data for a value can be used to improve the quality of the clustering. A new distance function that is based on the distribution of errors in data (and may be viewed as a generalization of the classical Euclidian distance function) can be used in clustering.

Although the following discussion focuses on the utility of the new distance function for time-series clustering, the concept of incorporating information about error in the distance function can be used in developing a distance function in any clustering application in which data that is clustered in other ways.

The Problem

We describe the problem being solved in the following new way:

Let m objects (e.g., seasonalities) be represented by m data points (e.g., sales demand rates) in n-dimensional space (e.g., representing n weeks). Each of these m data points represents a Gaussian distribution of data values, which defines the average value of each data point and also specifies the standard error associated with each data point.

We group these data points into clusters so that it is likely that data points (sales demand rates) in the same cluster are similar to (close to) each other, and data points in different clusters are unlikely to be close to each other, the likelihood being defined with respect to the Gaussian distributions represented by the data points. In contrast to other clustering techniques, two data points that differ significantly in their means may belong to the same cluster if they have high errors associated with them, and two data points that do not differ much in their means might belong to different clusters if they are well-calculated and have small errors.

Seasonality Forecasting

As one example, we consider the forecasting of seasonality for retailers based on sales data from previous years. Seasonality is defined as the underlying demand for a group of similar merchandise items as a function of time of the year that is independent of external factors like changes in price, inventory, and promotions. Seasonality for an item is expected to behave consistently from year to year.

In the retail industry, it is important to understand the seasonal behaviors in the sales of items to correctly forecast demand and make appropriate business decisions with respect to each item. Different items may be characterized by different seasonalities for a year. Yet, to reduce random variability and make better demand forecasts, it is desirable to group items with similar seasonal behavior together.

In this application, the objects to be clustered are the seasonalities of different groups of retail items. Effective clustering of retail items yields better forecasting of seasonal behavior for each of the retail items. Therefore, we identify a set of clusters of seasonalities that model most of the items sold by the retailer and relate each item to average seasonality of the cluster.

We model seasonality forecasting as a time-series clustering problem in the presence of errors, and we discuss experimental results on retail industry data. We have discovered meaningful clusters of seasonality that have not been uncovered by clustering methods that do not use the error information.

We assume that external factors, like price, promotions, and inventory, have been filtered from our data, and that the data has been normalized so as to compare sales of different items on the same scale. After normalization and filtering for external factors, the remaining demand rate of an item is determined by its Product Life Cycle (PLC) and seasonality. PLC is defined as the base demand of an item over time in the absence of seasonality and all other external factors.

Filtering Product Life Cycle Effects

As shown in FIG. 1, for example, in a typical PLC 14, an item is introduced on a certain date 10 and removed from stores on a certain date 12. PLC 14 is a curve between the introduction date and removal date. The shape of the curve is determined by the duration of time an item is sold 16 and also the nature of the item. For example, a fashion item (right-hand curve 15) will sell out faster a non-fashion item (left-hand curve 14). For simplicity, we assume the PLC value to be zero during weeks when the item is not sold.

Because sales of an item is a product of its PLC and its seasonality, it is not possible to determine seasonality just by looking at the sales data of an item. The fact that items having the same seasonality might have different PLCs complicates the problem.

For example, if both the items for which PLC curves are shown in FIG. 1 follow the same seasonality 20 as shown in FIG. 2, then the sales of the two items (non-fashion and fashion) will be as shown in the two different curves 22 and 24 shown in the right-hand side of FIG. 2. Curves 22 and 24 are respectively the products of curves 14, 15 of FIG. 1 and the seasonality curve 20 in FIG. 2.

The first step is to remove as much as possible of the PLC factor from the sales data so that only the seasonality factor remains.

Initially, based on prior knowledge from merchants, we group items that are believed to follow similar seasonality over an entire year. As shown in FIG. 3, the items in the set 30 follow similar seasonality but may be introduced and removed at different points of time during the year. The set typically includes items having a variety of PLCs that differ in their shapes and durations of time. The weekly average of all PLCs in this set is a somewhat flat curve 32 as shown on the right-hand side of FIG. 3, implying that the weekly average of PLCs for all items in the set can be assumed to be constant.

This implies that averaging of weekly filtered demand rates of all items in the set would nullify the effect of PLCs and would correspond to the common value of seasonality indices for the items in the set to within a constant factor. The constant factor can be removed by appropriate scaling of weekly sales averages. Although the average values obtained above give a reasonably good estimate of seasonality, they will have errors associated with them depending on how many items were used to estimate seasonality and also on how well spread are their PLCs.

Error Information

Let $\sigma_j^2$ be the variance of all the filtered demand rates for a set (e.g., one of the sets described above) of retail items in week j. To be clear, we are capturing the variance of the data values that represent the units of sales of the various items for a given week j as found in, say, one year of historical sales data. If there are a total of m items in this set, then an estimate of $s_j$, which is the standard error in the estimation of the seasonality index for week j, is given by the following equation.

$$S_j = \frac{\sigma_j}{\sqrt{m}} \quad (1)$$

By seasonality index for week j, we mean the factor that represents the seasonality effect for all m items in the set relative to the baseline demand value. So, if the baseline demand is 20 units in week j and the seasonality index in week j is 1.3 then we expect the sales data in week j to be 26 units.

The above procedure provides a large number of seasonal indices, one for each set of retail items of merchandise, along with estimates of associated errors. We group these seasonal indices into a few clusters based on the average values and errors as calculated above, thus associating each item with one of these clusters of seasonal indices. The seasonality index of a cluster is defined as a weighted average of seasonalities present in the cluster as shown by equation 3 below. The cluster seasonality obtained in this way is much more robust because of the large number of seasonalities used to estimate it.

To summarize the discussion to this point, based on prior knowledge about which items, of the thousands of items that appear in a merchant's hierarchy of items, follow similar seasonality, we group items into sets of items that have similar seasonality. We estimate the seasonality for each of these sets and also estimate the error associated with our estimate of seasonality. This provides us with a large number of seasonalities along with associated errors. We cluster these seasonalities into a few clusters, then calculate the average seasonality of each cluster. The final seasonality of an item is the seasonality of the cluster to which it belongs.

Generating seasonality forecasts by clustering without incorporating the errors information would disregard the fact that we do not know how much confidence we have in each seasonality. If we have high confidence in the estimate of a seasonality, then we would like to be more careful in assigning it to a cluster. On the other hand, if we have little confidence in the estimate of a seasonality, then its membership in a cluster does not have high significance in the cumulative average seasonality of the cluster. Errors or the associated probability distributions capture the confidence level of each seasonality and can be used intelligently to discover better clusters in the case of stochastic data.

Representation of Time-Series

Time-series are widely used in representing data in business, medical, engineering, and social sciences databases. Time-series data differs from other data representations in the sense that data points in a time-series are represented by a sequence typically measured at equal time intervals.

Stochastic data can be represented by a time-series in a way that models errors associated with data.

A time-series of stochastic data sampled at k weeks is represented by a sequence of k values. In our application, where we assume, for example, that the k samples are independent of each other and are each distributed according to one-dimensional Gaussian distribution, we represent a time-series A as:

$A=\{(\mu_1, s_1, w_1), (\mu_2, s_2, w_2), \ldots, (\mu_k, s_k, w_k)\}$ where the stochastic data of the $i^{th}$ sample of A is normally distributed with mean $\mu_i$ and standard deviation $s_i$. $w_i$ is a weight function to give relative importance to each sample of the time-series. Weights are chosen such that $\Sigma_i(\mu_i * w_i) = k$ so as to express time-series on the same scale. This normalization is important in the following sense. First of all, these weights reflect the relative, not absolute, importance of each sampled value. Secondly, the normalization converts the data into a unit scale thereby comparing differences in the shapes of time-series and not in the actual values. In FIG. 4, for example, the normalization will facilitate putting the time-series A and the time-series B in the same cluster and the time-series C in a separate cluster.

Although one can experiment with different weights for different sample values of a time-series, for simplicity, we assume that all the k sample values of a time-series have equal weight. Henceforth, we will work with the following compact representation of time-series. $A=\{(\mu'_1, s'_1), (\mu'_2, s'_2), \ldots, (\mu'_k, s'_k)\}$, where $\mu'_i = \mu_i * w$ and $s'_i = s_i * w$, for $i=1, 2, \ldots, k$ where $$w = \frac{k}{\sum_l \mu_l}.$$

In the case of seasonality forecasting, we may have k equal to 52 corresponding to 52 weeks in a year, and $\mu_i$ be the estimate of the seasonality index for $i^{th}$ week. $s_i$ represents the standard error in the estimated value of $\mu_i$.

We have assumed that sales data that are used to estimate means and errors of the respective k sample values of a time-series come from independent distributions. Although we might observe some level of independence, complete independence is not possible in real data. Especially in time-series data, one expects a positive correlation in consecutive sample values. Therefore, while incorporating the concept of dependence can be difficult, it can improve the test statistic for distance and subsequently give a more accurate measure of the distance function. In the case of seasonality forecasting, we deal with seasonality values that are obtained by taking the average of sales data of items having different PLCs. These PLCs are pretty much random for a large sample of data and therefore averaging over these random PLCs may dampen the effect of dependency among different samples. This implies that dependency is not a serious issue in our application, a proposition that is also observed experimentally.

Distance Function

As in other clustering methods, we make a basic assumption that the relationship among pairs of seasonalities in a set of n seasonalities is described by an n×n matrix containing a measure of dissimilarity between the $i^{th}$ and the $j^{th}$ seasonalities. In clustering parlance, the measure of dissimilarity is referred to as a distance function between the pair of seasonalities. Various distance functions have been considered for the case of deterministic data. We have developed a probability-based distance function in the case of multidimensional stochastic data.

Consider two estimated seasonality indices $A_i = \{(\mu_{i1}, s_{i1}), (\mu_{i2}, s_{i2}), \ldots, (\mu_{ik}, s_{ik})\}$ and $A_j = \{(\mu_{j1}, s_{j1}), (\mu_{j2}, s_{j2}), \ldots, (\mu_{jk}, s_{jk})\}$. $A_i$ and $A_j$ are the estimated time-series of two seasonalities based on historically observed sales for corresponding sets of items. Let the corresponding true seasonalities be $\{\bar{\mu}_{i1}, \bar{\mu}_{i2}, \ldots, \bar{\mu}_{ik}\}$ and $\{\bar{\mu}_{j1}, \bar{\mu}_{j2}, \ldots, \bar{\mu}_{jk}\}$. This means that the $\mu$'s are the observed means that are associated with the true means of $\bar{\mu}$'s.

We define similarity between two seasonalities (time-series) as the probability that the two seasonalities might be the same. Two seasonalities are considered the same if the corresponding $\mu$'s are close with high significance with respect to the associated errors. In other words, if we define the null hypothesis $H_o$ as $A_i = A_j$ then similarity between $A_i$ and $A_j$ is the significance level of this hypothesis. Here, $A_i = A_j$ means corresponding $\bar{\mu}_{il} = \bar{\mu}_{jl}$ for $l=1, \ldots, k$. The distance or dissimilarity $d_{ij}$ between $A_i$ and $A_j$ is defined as (1—similarity). In other words, $d_{ij}$ is the probability of rejecting the above hypothesis. This distance function satisfies the following desirable properties.

dist(A,B)=dist(B, A)

dist(A,B)≧0 dist(A,A)=0 dist(A,B)=0 ⇒A=B

The statistic for the test of the above hypothesis is $$\sum_{l=1}^{k} \left(\frac{\mu_{il} - \mu_{jl}}{s_l}\right)^2$$

where $s_l$ is the pooled variance for week l defined as ⇒

Under a Gaussian assumption, the above statistic follows a Chi-Square distribution with k−1 degrees of freedom. Therefore, the distance $d_{ij}$ which is the significance level of rejecting the above hypothesis is given by the following equation.

$$d_{ij} = \text{ChiSqr\_PDF}\left(\sum_{l=1}^{k}\left(\frac{\mu_{il}-\mu_{jl}}{s_l}\right)^2, k-1\right) \quad (2)$$

We use this distance between pairs of seasonality indices as the basis for clustering them by putting pairs that have low distances in the same cluster and pairs that have high distances in different clusters. We use a confidence interval (e.g., 90%) to find a threshold distance. If the distance between two seasonalities is less than the threshold distance value, we put them in the same cluster.

Merging Time-Series

Here we define a 'merge' operation to combine information from a set of time-series and produce a new time-series that is a compromise between all the time-series used to produce it. In seasonality forecasting, the time-series are sets of seasonalities and the new time-series represents the weighted average seasonality for a cluster of seasonalities. The shape of the resulting time-series depends not only on the sample values of individual time-series but also on errors associated with individual time-series.

Given r time-series $A_i = \{(\mu_{i1}, s_{i1}), (\mu_{i2}, s_{i2}), \ldots, (\mu_{ik}, s_{ik})\}$, $i=1, 2, \ldots r$ then the resulting time-series $C=\{(\mu_1, s_1), (\mu_2, s_2), \ldots, (\mu_k, s_k)\}$ is given by $$\mu_j = \frac{\sum_{i=1}^{r}\frac{\mu_{ij}}{s_{ij}^2}}{\sum_{i=1}^{r}\frac{1}{s_{ij}^2}} \quad j=1, 2, \ldots, k \quad (3)$$

$$s_j = \frac{1}{\sqrt{\sum_{i=1}^{r}\frac{1}{s_{ij}^2}}} \quad j=1, 2, \ldots, k \quad (4)$$

As shown in the example of FIG. 5, consider two time-series 40 and 42 in which the curves 44, 46 represent the average values at each of 26 samples of time represented along the horizontal axis. The vertical line 48 for each of the samples represents the error associated with the sample at that time. The time-series 50 is the resulting sequence when the time-series 40 and 42 are merged in the manner discussed above. As can be seen, portions of each of the time-series 40 and 42 for which the errors are relatively smaller than in the other time-series serve more prominently in the merged time series 50. Therefore, if the series 50 represented a merged seasonality of two merchandise items as part of a cluster of items, a retailer could use the series 50 as a more accurate prediction of seasonality of the items that make up the cluster than would have been represented by clustered seasonalities that were merged without the benefit of the error information. This helps the retailer make better demand forecast as shown by experimental results.

Experimental Results

We generated data sets as described below. First we generated ten different kinds of PLCs from a Weibull distribution with different parameters. These PLCs differ in their peaks and shapes depending on the parameters used in the distribution, as shown in FIG. 6. The PLC data is randomly generated by choosing one of these 10 PLCs with equal probability and a uniformly distributed starting time over a period of one year.

Figure 7:
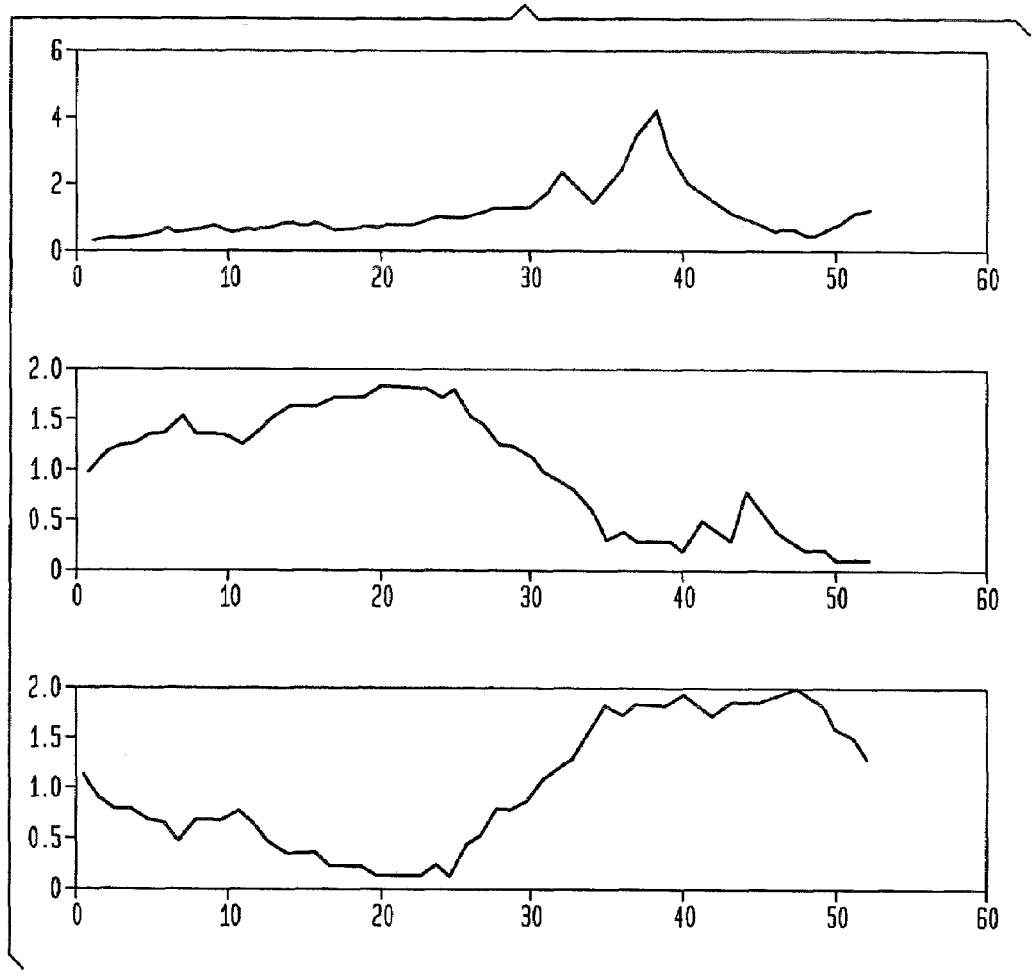

Then we considered three different seasonalities corresponding to Christmas seasonality, summer seasonality, and winter seasonality respectively, as shown in FIG. 7. We generated sales data by multiplying the randomly generated PLC data with one of the three seasonalities. When we considered twelve instances, each instance produced by generating 25-35 PLCs, multiplying them by one of the above seasonalities and averaging weekly sales to obtain an estimate of corresponding seasonality, we obtained the values of seasonalities with associated estimates of errors as shown in FIG. 8.

Figure 8:
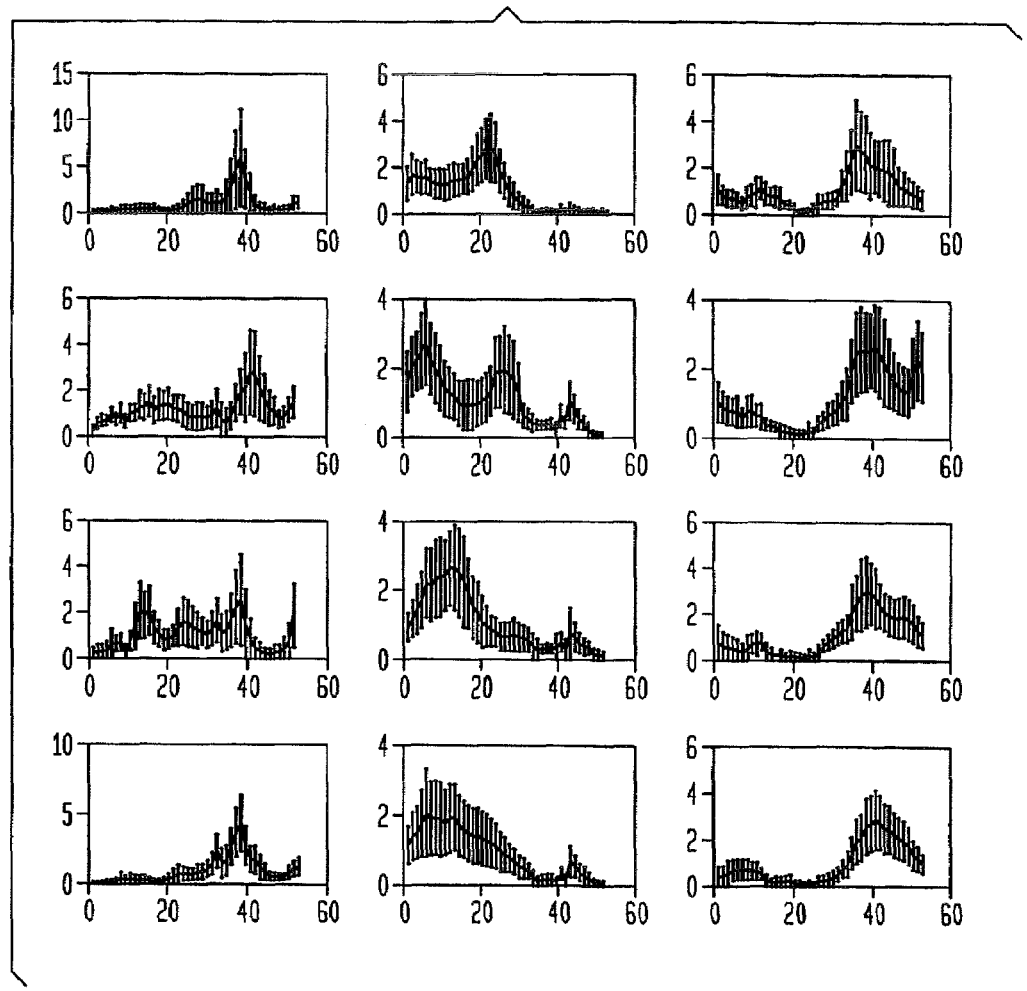
Figure 9:
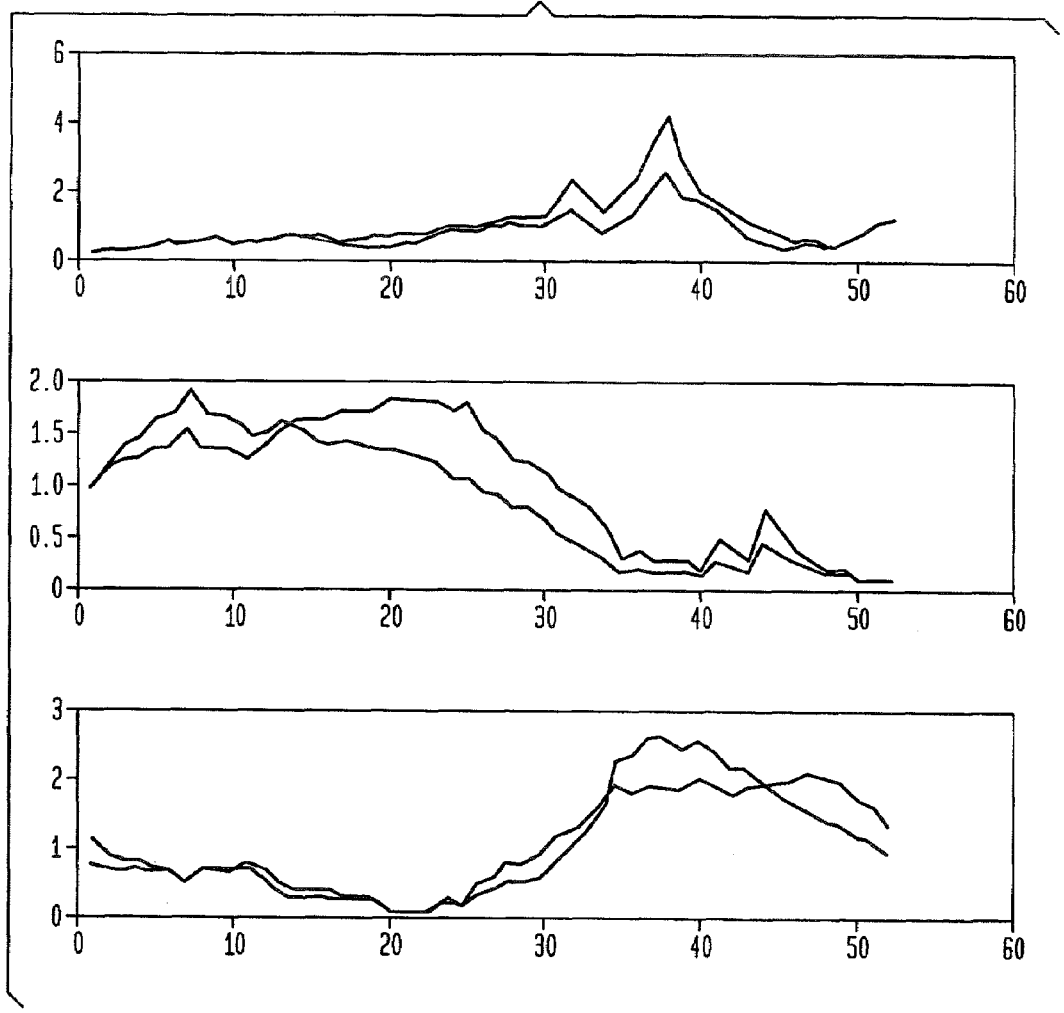
Figure 10:
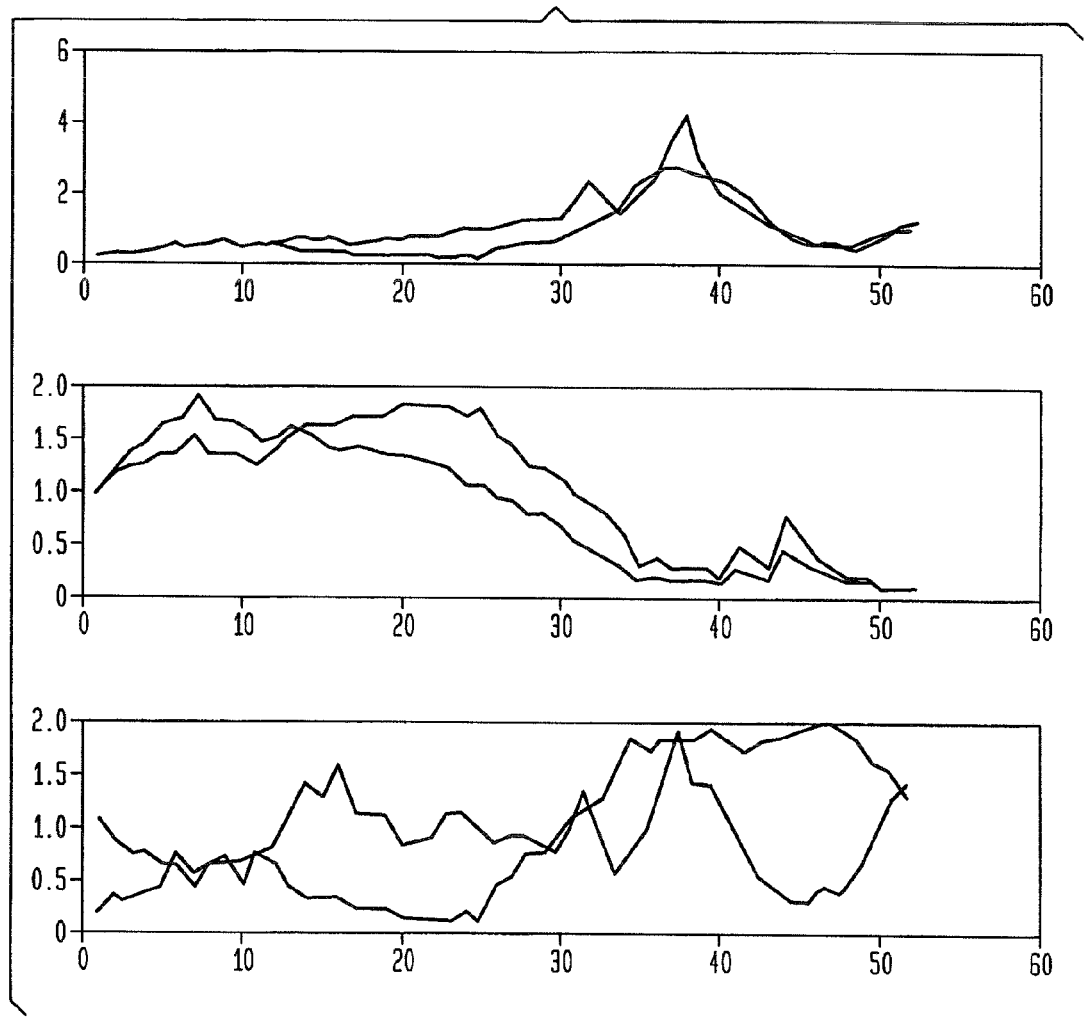

As shown in FIG. 8, some of the seasonalities do not correspond to any of the original seasonalities and each has large errors. We ran the clustering method as described above and we got three clusters with cluster centers as shown in FIG. 9, where cluster centers are obtained by averaging of all PLCs in the same cluster according to equations 3 and 4. The resulting seasonalities match the original seasonalities of FIG. 7 well as shown in FIG. 9. We compared our result with standard hierarchical clustering that did not consider the information about errors. The number of misclassifications were higher when we used hierarchical clustering with standard Euclidean distance without accounting for errors; as shown in FIG. 10.

Actual Data Results

Figure 11:
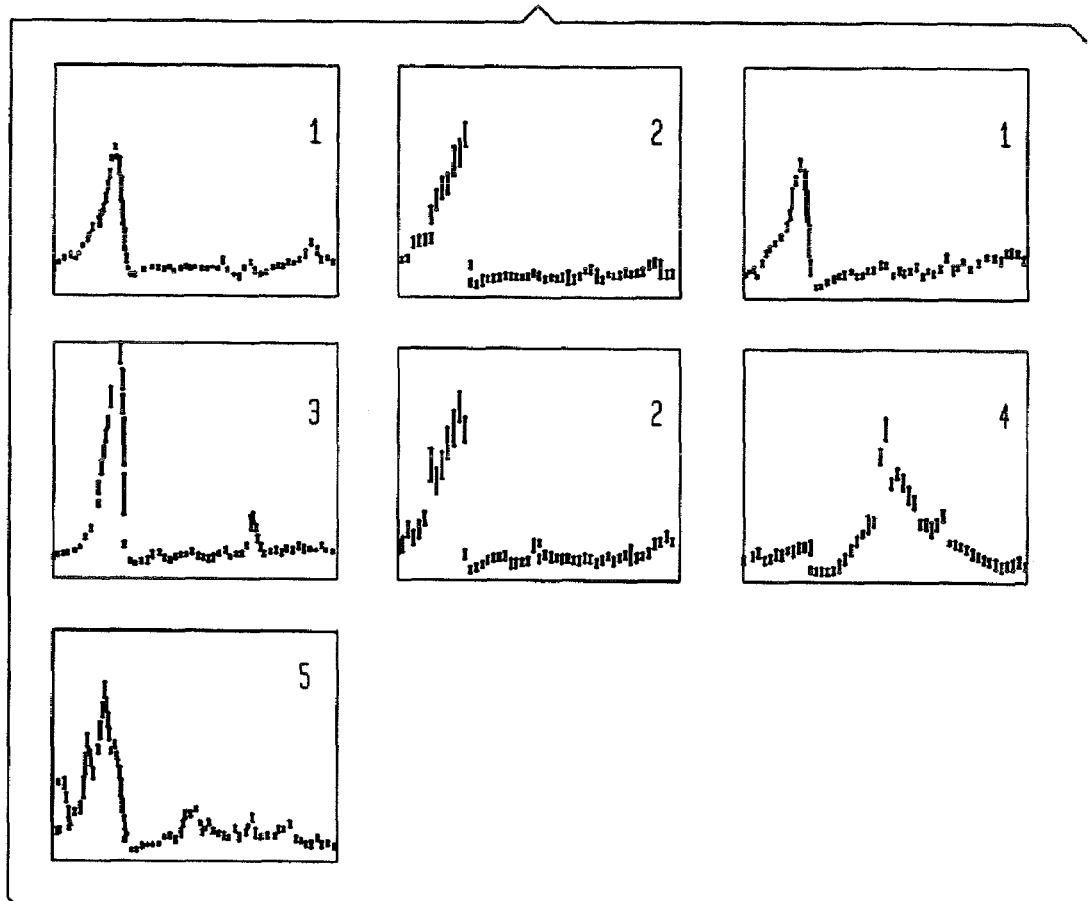
Figure 12:
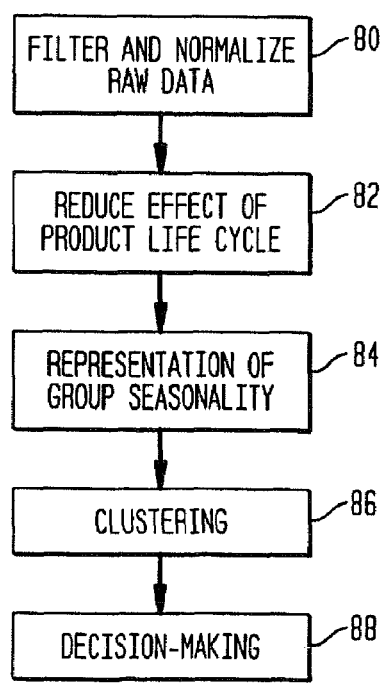

FIG. 11 shows an example based on actual retail sales data. Each of the seven time-series in this figure represents a seasonality that is obtained from a group of items that are known to follow similar seasonality. The clustering of the seven sets provides five clusters as shown in the figure.

The expressing of data in a way that incorporates error information, the expressing of a distance function based on the error information, the clustering of data sets using the distance function, the merging of clusters of data sets, the specific applications of the techniques to time-series data, including seasonality time-series for retail items, and other techniques described above, can be done using computers or machines controlled by software instructions.

For example, as shown in FIG. 12, the software would be stored in memory or on a medium or made available electronically, and would enable the computer or machine to perform the following sequence, for example, in the context of a retailer making pricing or inventory decisions with respect to retail items. After filtering and normalizing the historical time-sequence sales data for a number of items, in step 80, the data would be grouped and processed in step 82 to reduce the effect of the product life cycle factor. This would include grouping items known to have similar seasonality, scaling, and determining variance and standard errors with respect to each group. The seasonality indices for each of the groups would then be expressed in a representation (step 84) that captures both (a) the mean values of seasonality for a set of items for each period and (b) the statistical or error information that represents the confidence level with respect to the mean values of seasonality. The software would analyze the various seasonality time-series using the distance functions (step 86) to cluster the time-series, and then would use the clustered time-series as part of the basis for decision-making (step 88). Additional information about the collection of such information and the making of such decisions is found in U.S. patent application Ser. No. 09/263,979, filed Mar. 5, 1999, Ser. No. 09/826,378, filed Apr. 4, 2001, and Ser. No. 09/900,706, filed Jul. 6, 2001, all incorporated by reference here.

Other implementations are within the scope of the following claims.

The invention claimed is:

1. A computer-based method of clustering data sets comprising executing on a computer the steps of:

receiving a first set of data containing a plurality of data points, each of which is expressed as a value and an associated error;

determining a distance between the first set of data and each of one or more other sets of data, where each of those other data sets contains a plurality of data points, each of which is expressed as a value and an associated error, the determining step including measuring each distance as a function, at least in part, of the error associated with one or more data points in each of the sets of data for which the distance is determined, including measuring each distance as a function of the value and the error associated with one or more data points in each of the sets of data for which the distance is determined, in which the distance is measured based on $$d_{ij} = \text{ChiSqr\_PDF}\left(\sum_{l=1}^{k} \left(\frac{\mu_{il} - \mu_{jl}}{s_l}\right)^2, k-1\right)$$

where $d_{ij}$ is a measure of the distance between set of data i and set of data j ChiSqr PDF is a Chi-square distribution function k is a number of data points in each of sets of data i and j l is an index $u_{il}$ is a $l^{th}$ value of set of data i $u_{jl}$ is a $l^{th}$ value of set of data j $$s = \sqrt{s_{il}^2 + s_{jl}^2}$$

where $s_{il}$ is error associated with the $l^{th}$ value of set of data i and $s_{jl}$ is the error associated with the $l^{th}$ value of set of data j;

clustering the first set of data with at least one of the other sets of data to produce a cluster result, wherein the cluster result includes clusters formed by the clustering step, the clustering step including:

comparing a threshold one or more distances determined in the determining step; and generating a composite data set as a function of data points contained in the first set of data and the one or more other sets of data, if any, whose distances compared favorably with the threshold; and displaying the cluster result on a display device operably connected to the computer, wherein the displayed cluster result assists a user in making a decision with regards to items represented by the data points.

2. The method of claim 1 in which the respective data points of each data set are related in a time-sequence.

3. The method of claim 1 in which the data points relate to a seasonality of at least one item in commerce.

4. The method of claim 1 in which each of the sets of data relates to seasonalities of items of commerce.

5. The method of claim 4 in which the items of commerce comprise retail products, the data points relate to times during a season, and the values associated with each of the data points correspond to respective ones of the retail products.

6. The method of claim 5 wherein at least one of the errors is a statistical measures of the variability of the associated value in the respective set of data.

7. The method of claim 1 in which at least one value is a statistical mean and in which the associated error is a statistical measure of a distribution with respect to that mean.

8. The method of claim 7 in which the statistical measure comprises a standard deviation.

9. The method of claim 1 in which the distribution of the values comprises a Gaussian distribution.

10. The method of claim 1 in which the clustering of data includes merging the data sets belonging to a cluster using a weighted average.

11. The method of claim 1 also including merging the seasonalities of the data sets belonging to a cluster.

12. A machine-accessible medium that when accessed results in a machine effecting actions comprising:

receiving a first set of data containing a plurality of data points, each of which is expressed as a value and an associated error;

determining a distance between the first set of data and each of one or more other sets of data, where each of those other data sets contains a plurality of data points, each of which is expressed as a value and an associated error, the determining step including measuring each distance as a function, at least in part, of the error associated with one or more data points in each of the sets of data for which the distance is determined, including measuring each distance as a function of the value and the error associated with one or more data points in each of the sets of data for which the distance is determined, in which the distance is measured based on $$d_{ij} = \text{ChiSqr\_PDF}\left(\sum_{l=1}^{k} \left(\frac{\mu_{il} - \mu_{jl}}{s_l}\right)^2, k-1\right)$$

where $d_{ij}$ is a measure of the distance between set of data i and set of data j ChiSqr PDF is a Chi-square distribution function k is a number of data points in each of sets of data i and j l is an index $u_{il}$ is a $l^{th}$ value of set of data i $u_{jl}$ is a $l^{th}$ value of set of data j $$s = \sqrt{s_{il}^2 + s_{jl}^2}$$

where $s_{il}$ is error associated with the $l^{th}$ value of set of data i and $s_{jl}$ is the error associated with the $l^{th}$ value of set of data j;

clustering the first set of data with at least one of the other sets of data to produce a cluster result, wherein the cluster result includes clusters formed by the clustering step, the clustering step including:

comparing a threshold one or more distances determined in the determining step; and generating a composite data set as a function of data points contained in the first set of data and the one or more other sets of data, if any, whose distances compared favorably with the threshold; and displaying the cluster result on a display device operably connected to the computer, wherein the displayed cluster result assists a user in making decision with regards to items represented by the data points.

13. A computer program product, stored on computer readable medium, that when executed on a processor, determines composite seasonality time-series, the processor coupled to a display, the computer program product comprising:

computer program code for receiving data that represents seasonality time-series for each of a set of retail items, the data also representing error information associated with data values for each of a series of time points for each of the items, wherein the error information is used to measure a distance as a function of the error information, wherein a distance is measured as a function of the data value and the associated error information, in which the distance is measured based on $$d_{ij} = \text{ChiSqr\_PDF}\left(\sum_{l=1}^{k}\left(\frac{\mu_{il} - \mu_{jl}}{s_l}\right)^2, k-1\right)$$

where
$d_{ij}$ is a measure of the distance between set of data i and set of data j
ChiSqr PDF is a Chi-square distibution funtion
k is a number of data points in each of sets of data i and j
l is an index
$u_{il}$ is a $l^{th}$ value of set of data i
$u_{il}$ is a $l^{th}$ value of set of data j $$s = \sqrt{s} + s_{jl}^2$$

where $s_{il}$ is error associated with the $l^{th}$ value of set of data i and $s_{il}$ is the error associated with the $l^{th}$ value of set of data j;

computer program code for forming composite seasonality time-series based on respective clusters of the retail item seasonality time-series, the composites formed based in part on the error information; and computer program code for displaying composite seasonality time-series on a display device, wherein the displayed composite seasonality time-series assists a user in making a decision with recgards to items represented by the data points.

* * * * *

UNITED STATES PATENT AND TRADEMARK OFFICE
CERTIFICATE OF CORRECTION

| | | |
|---|---|---|
| PATENT NO. | : 7,437,308 B2 | |
| APPLICATION NO. | : 11/017285 | |
| DATED | : October 14, 2008 | |
| INVENTOR(S) | : Kumar et al. | |

It is certified that error appears in the above-identified patent and that said Letters Patent is hereby corrected as shown below:

On face page, in field (54), in column 1, under "Title", in line 4, delete "DATE" and insert -- DATA --, therefor.

On page 2, in column 2, under "Other Publications", line 6, delete "[retrieed" and insert -- [retrieved --, therefor.

On page 2, in column 2, under "Other Publications", line 62, delete "KNowledge" and insert -- Knowledge --, therefor.

In column 1, line 4, delete "DATE" and insert -- DATA --, therefor.

In column 6, line 67, after "defined as" delete "=>".

In column 9, line 30, in claim 1, delete "$\left(\sum_{i=1}^{k}\right.$" and insert -- $\left(\sum_{l+l}^{k}\right.$ --, therefor.

In column 9, line 40, in claim 1, delete "$u_{il}$" and insert -- $u_{jl}$ --, therefor.

In column 10, line 40, in claim 12, delete "$\left(\sum_{i=1}^{k}\right.$" and insert -- $\left(\sum_{l+l}^{k}\right.$ --, therefor.

In column 10, line 50, in claim 12, delete "$u_{il}$, and insert -- $u_{jl}$ --, therefor.

In column 11, line 3, in Claim 12, after "making" insert -- a --.

Signed and Sealed this
First Day of March, 2011

David J. Kappos
*Director of the United States Patent and Trademark Office*

CERTIFICATE OF CORRECTION (continued)
U.S. Pat. No. 7,437,308 B2

In column 11, line 22, in claim 13, delete "$\left(\sum_{i=1}^{k}\right.$" and insert -- $\left(\sum_{I+l}^{k}\right.$ --, therefor.

In column 12, line 4, in claim 13, delete "distibution funtion" and insert -- distribution function --, therefor.

In column 12, line 8, in claim 13, delete "$u_{il}$" and insert -- $u_{jl}$ --, therefor.

In column 12, line 20, in claim 13, after "displaying" insert -- the --.

In column 12, line 23, in claim 13, delete "recgards" and insert -- regards --, therefor.